US011899796B2

(12) United States Patent
Liu et al.

(10) Patent No.: US 11,899,796 B2
(45) Date of Patent: Feb. 13, 2024

(54) INITIALIZATION GEO-LOCKING SYSTEM

(71) Applicant: Dell Products L.P., Round Rock, TX (US)

(72) Inventors: Wei Liu, Austin, TX (US); Jason Young, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 17/505,264

(22) Filed: Oct. 19, 2021

(65) Prior Publication Data

US 2023/0124661 A1    Apr. 20, 2023

(51) Int. Cl.
*G06F 21/44* (2013.01)
*G06F 21/57* (2013.01)
*G06F 21/64* (2013.01)

(52) U.S. Cl.
CPC ............ *G06F 21/575* (2013.01); *G06F 21/44* (2013.01); *G06F 21/64* (2013.01); *G06F 2221/2111* (2013.01)

(58) Field of Classification Search
CPC ........ G06F 21/575; G06F 21/44; G06F 21/64; G06F 2221/2111
See application file for complete search history.

(56) References Cited

U.S. PATENT DOCUMENTS

| 8,560,839 | B2 | 10/2013 | Barham et al. | |
|---|---|---|---|---|
| 2005/0071677 | A1* | 3/2005 | Khanna | H04L 9/3236 726/4 |
| 2008/0012759 | A1* | 1/2008 | Te-Yi | G01S 19/34 342/357.74 |
| 2019/0253835 | A1* | 8/2019 | Jones | G08G 5/006 |
| 2021/0334382 | A1* | 10/2021 | Chhuor | G06F 21/44 |

* cited by examiner

*Primary Examiner* — Zahid Choudhury
(74) *Attorney, Agent, or Firm* — Joseph Mencher

(57) ABSTRACT

An initialization geo-locking system includes a chassis housing a location determination subsystem and an initialization management subsystem. During an initialization process that begins in response to receiving initialization power, the initialization management system determines that geo-locking is activated and, in response, causes power to be provided to the location determination subsystem and then subsequently identifies a first current location determined by the location determination subsystem. The initialization management subsystem then determines whether the first current location determined by the location determination subsystem corresponds to an authorized initialization location stored in the initialization management subsystem and, if so, halts the initialization process while, if not, allows the initialization process to complete.

20 Claims, 16 Drawing Sheets

INITIALIZATION GEO-LOCKING SYSTEM

BACKGROUND

The present disclosure relates generally to information handling systems, and more particularly to locking the initialization of information handling systems based on their geographic location.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, are often ordered by customers and shipped to a customer location where they are subsequently used. For example, Telephone Communications (Telco) customers often order server devices and other computing devices for use at edge locations such as cellular tower systems (e.g., a 5G hub), and have those computing devices shipped directly to those edge locations by a third party. However, the shipping of computing devices in such a manner raises the possibility of the computing device being accessed to, for example, install malicious software that may subsequently provide unauthorized access to the edge location once that computing device is deployed at that edge location. As such, a high degree of trust is required with regard to the honesty of the shipping providers, their security procedures, and other aspects of the shipping, delivery, and/or other transportation of computing devices.

Accordingly, it would be desirable to provide for the transportation of computing devices while addressing the issues discussed above.

SUMMARY

According to one embodiment, an Information Handling System (IHS) includes a processing system; and a memory system that is coupled to the processing system and that includes instructions that, when executed by the processing system, cause the processing system to provide an initialization management engine that is configured, during a first initialization process that begins in response to receiving initialization power, to: determine that geo-locking is activated; cause, in response to determining that geo-locking is activated, power to be provided to a location determination subsystem; identify, subsequent to the power being provided to the location determination subsystem, a first current location determined by the location determination subsystem; determine whether the first current location determined by the location determination subsystem corresponds to an authorized initialization location stored in an initialization management database; and halt, in response to determining that the first current location does not correspond to the authorized initialization location, the first initialization process.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
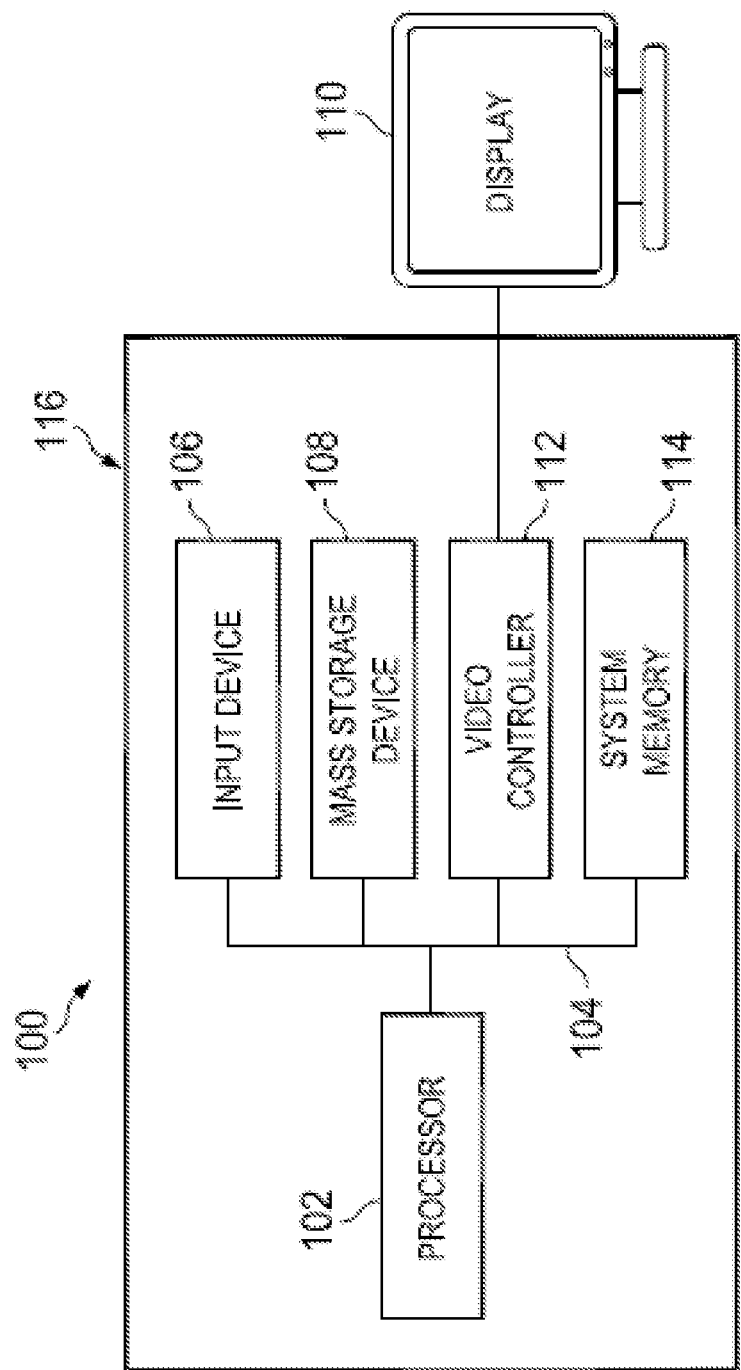
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
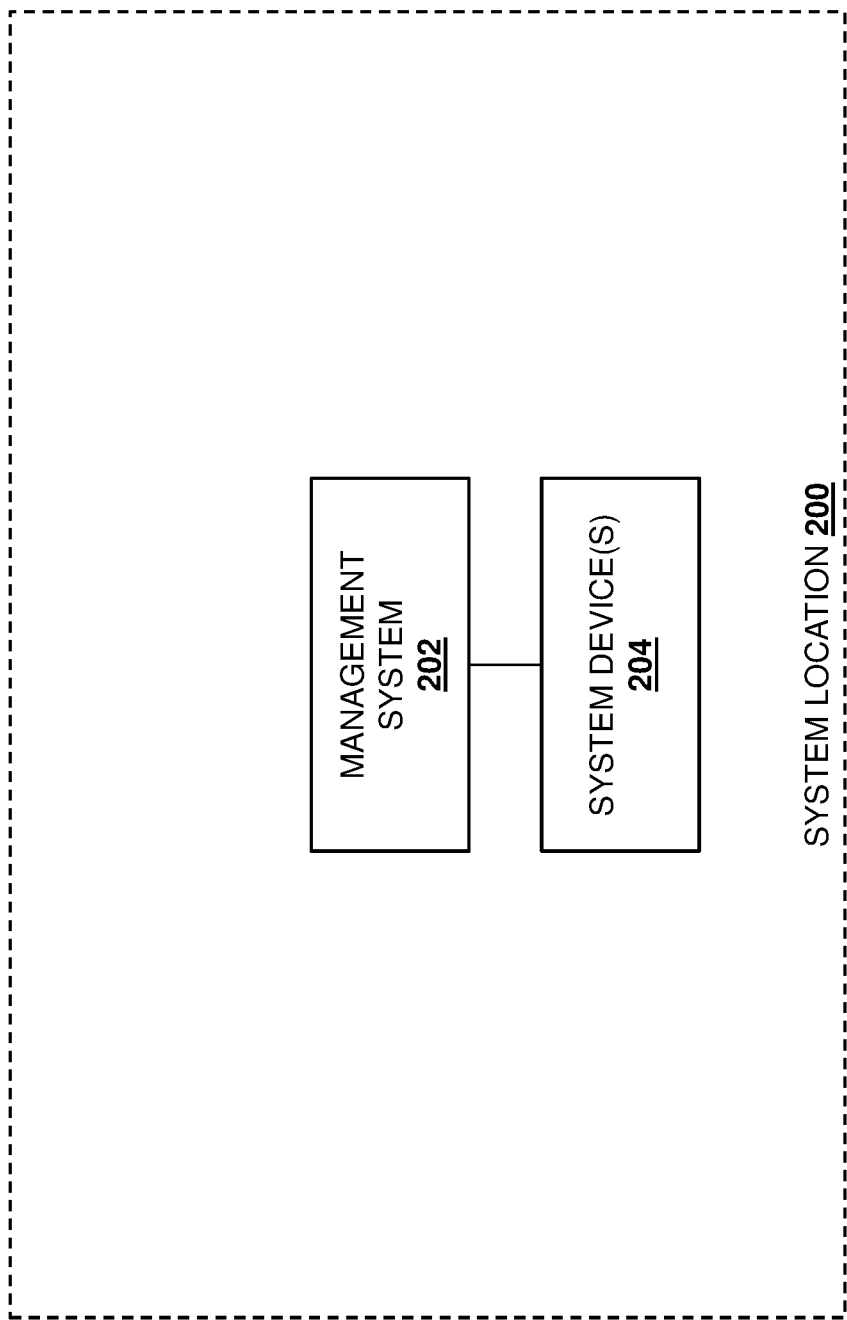
FIG. 2 is a schematic view illustrating an embodiment of a system location that may be used in the initialization geo-locking system of the present disclosure.

Referring now to FIG. 2, an embodiment of a system location 200 is illustrated that, in some of the examples below, is provided by a cellular tower or other telecommunications edge system at a particular geographic location, but that one of skill in the art in possession of the present disclosure will appreciate may be any of a variety of locations that include systems that include the computing devices, system devices, and/or management systems discussed below. In the illustrated embodiment, the system location 200 includes a management system 202. In an embodiment, the management system 202 may be provided by the IHS 100 discussed above with reference to FIG. 1, and/or may include some or all of the components of the IHS 100, and in specific examples may be provided by a management server device. However, while illustrated and discussed as being provided by a management server device, one of skill in the art in possession of the present disclosure will recognize that management systems provided in the system location 200 may include any devices that may be configured to operate similarly as the management system 202 discussed below.

In the illustrated embodiment, the system location 200 also includes one or more system device(s) 204. Continuing with the specific example provided below in which the system location 200 is provided by a cellular tower or other telecommunications edge location, system device(s) 204 may be provided by any of a variety of cellular tower devices, edge location devices, and/or other devices that would be apparent to one of skill in the art in possession of the present disclosure. However, while a specific system location 200 has been illustrated and described, one of skill in the art in possession of the present disclosure will recognize that the system location of the present disclosure may include a variety of components and component configurations while remaining within the scope of the present disclosure as well.

Figure 3:
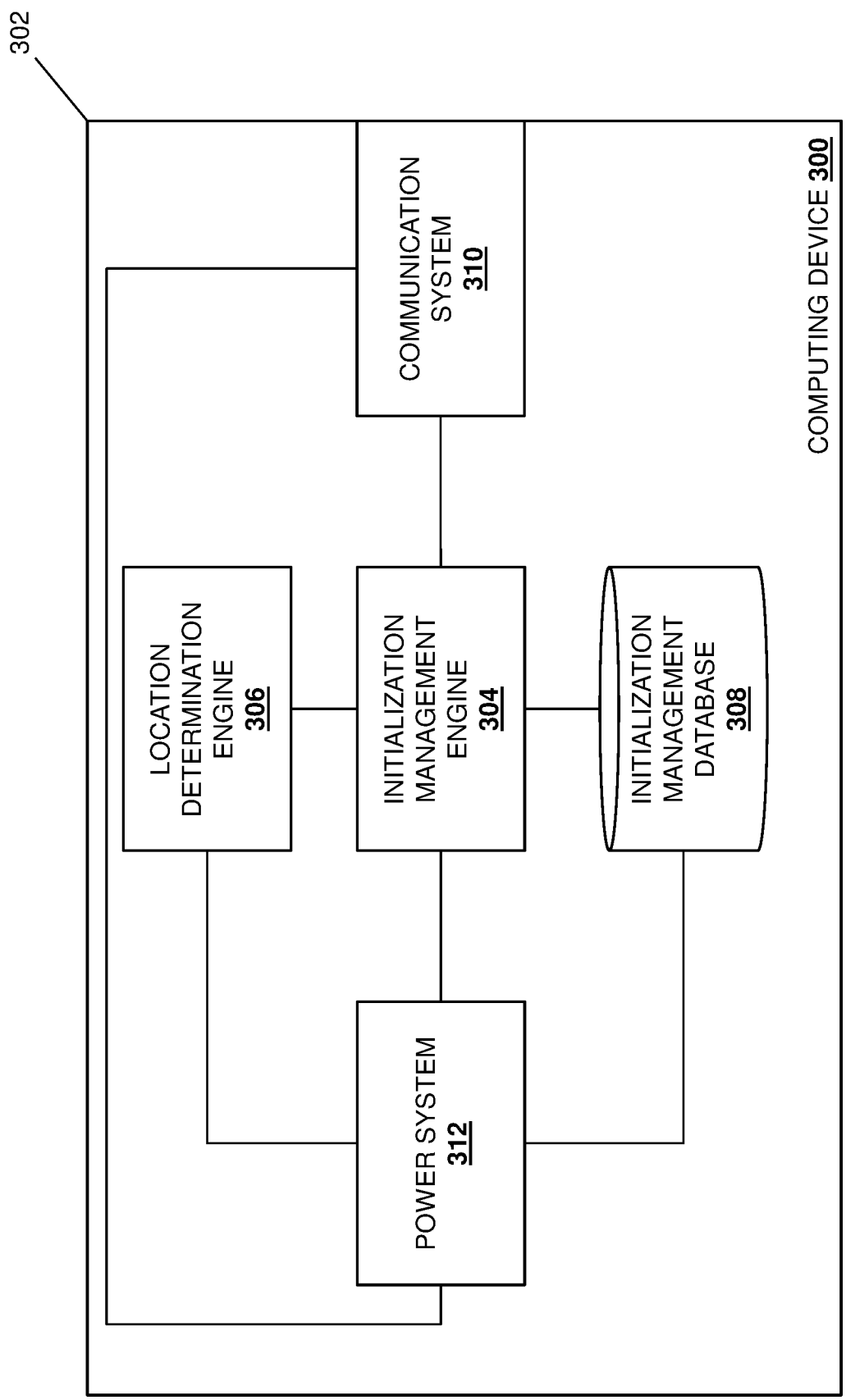
FIG. 3 is a schematic view illustrating an embodiment of a computing device that may include the initialization geo-locking system of the present disclosure.

Referring now to FIG. 3, an embodiment of a computing device 300 is illustrated that may provide the initialization geo-locking system of the present disclosure. In an embodiment, the computing device 300 may be provided by the IHS 100 discussed above with reference to FIG. 1 and/or may include some or all of the components of the IHS 100, and in specific examples may be provided by a server device. Furthermore, while illustrated and discussed as being provided by a server device, one of skill in the art in possession of the present disclosure will recognize that the functionality of the computing device 300 discussed below may be provided by other devices (e.g., networking devices such as switch devices, storage systems, etc.) that are configured to operate similarly as discussed below. In the illustrated embodiment, the computing device 300 includes a chassis 302 that houses the components of the computing device 300, only some of which are illustrated and discussed below. For example, the chassis 302 may house an initialization management processing system (not illustrated, but which may include the processor 102 discussed above with reference to FIG. 1) and an initialization management memory system (not illustrated, but which may include the memory 114 discussed above with reference to FIG. 1) that is coupled to the initialization management processing system and that includes instructions that, when executed by the initialization management processing system, cause the initialization management processing system to provide an initialization management engine 304 that is configured to perform the functionality of the initialization management engines and/or initialization management subsystems discussed below.

In a specific example, the initialization management engine 304 may be provided (at least in part) by a Basic Input/Output System (BIOS)/Unified Extensible Firmware Interface (UEFI) that includes at least a portion of the processing system (e.g., a BIOS processing system) and the memory system (e.g., a BIOS memory system) discussed above that includes instructions that, when executed by the processing system, cause the processing system to provide the initialization management engine 304 that is configured to perform the functionality of the initialization management engines and/or initialization management subsystems discussed below. In another example, the initialization management engine 304 may be provided (at least in part) by a remote access controller device (e.g., the integrated DELL® Remote Access Controller (iDRAC) available in server devices provided by DELL® Inc. of Round Rock, Texas, United States; a Baseboard Management Controller (BMC), etc.) that includes at least a portion of the processing system (e.g., a remote access controller processing system) and the memory system (e.g., remote access controller memory system) discussed above that includes instructions that, when executed by the processing system, cause the processing system to provide the initialization management engine 304 that is configured to perform the functionality of the initialization management engines and/or initialization management subsystems discussed below. However, while two specific subsystems are discussed above as providing at least a portion of the initialization management engine 304, one of skill in the art in possession of the present disclosure will appreciate how the functionality of the initialization management engine 304 may be provided by only one of those subsystem, other subsystems, while remaining within the scope of the present disclosure as well.

The chassis 302 may also house a location determination processing system (not illustrated, but which may include the processor 102 discussed above with reference to FIG. 1) and a location determination memory system (not illustrated, but which may include the memory 114 discussed above with reference to FIG. 1) that is coupled to the location determination processing system and that includes instructions that, when executed by the location determination processing system, cause the location determination processing system to provide location determination engine 304 that is configured to perform the functionality of the location determination engines and/or location determination subsystems discussed below. As will be appreciated by one of skill in the art in possession of the present disclosure, the location determination engine/subsystem discussed herein may be provided by a Global Position System (GPS) device, a Global Navigation Satellite System (GNSS) device, a GPS augmentation system (e.g., an Assisted GNSS (A-GNSS) system, a Wide Area Augmentation System (WAAS), etc.), as well as other location determination subsystems (e.g., cellular tower triangulation subsystems) known in the art, and may utilization a variety of location determination components (e.g., WIFI, Bluetooth®, cellular tower triangulation components, etc.) in order to make the location determinations discussed below. In a specific example, the computing device 300 may be configured for Telco operations, which one of skill in the art in possession of the present disclosure will recognize typically requires location determination capabilities or functionality (e.g., most cellular tower equipment, particular at edge locations, is capable is determining and reporting its current location, as well as being cryptographically trusted, in order to allow identification of verified connections to that cellular tower at its particular location).

The chassis 302 may also house a storage system (not illustrated, but which may include the storage 108 discussed above with reference to FIG. 1) that is coupled to the initialization management engine 304 (e.g., via a coupling between the storage system and the processing system) and that includes a initialization management database 308 that is configured to store any of the information utilized by the initialization management engine 304 discussed below (e.g., with the initialization management engine 304a and the initialization management database 308 providing the initialization management subsystem described herein). As discussed below, the initialization management database 308 may store flags, certificates (e.g., the cryptographically signed certificates discussed below), and/or other information discussed below. As such, in some embodiments, the storage system providing the initialization management database 308 may be provided by an erase-resistant portion of a storage system (e.g., a Non-Volatile Random Access Memory (NVRAM) region in the BIOS or remote access controller device, a Read-Protected Memory Block (RPMB) provided in silicon in a remote access controller device, a storage area of the BIOS that does not lose data in response to Non-Volatile Random Access Memory clear (NVRAM-_CLR) operations or Complementary Metal-Oxide-Semiconductor (CMOS) battery removal, and/or other erase-resistant storage that would be apparent to one of skill in the art in possession of the present disclosure).

The chassis 302 may also house a communication system 310 that is coupled to the initialization management engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. The chassis 302 may also house a power system 312 (e.g., a Power Supply Unit (PSU) and/or other power components) that is coupled to the initialization management engine 304 (e.g., the initialization management processing system and initialization management memory system), the location determination engine 306 (e.g., the location determination processing system and location determination memory system), the initialization management database 308 (e.g., the storage system), and the communication system 310, and that is configured to provide power to those components during and subsequent to initialization of the computing device 300. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
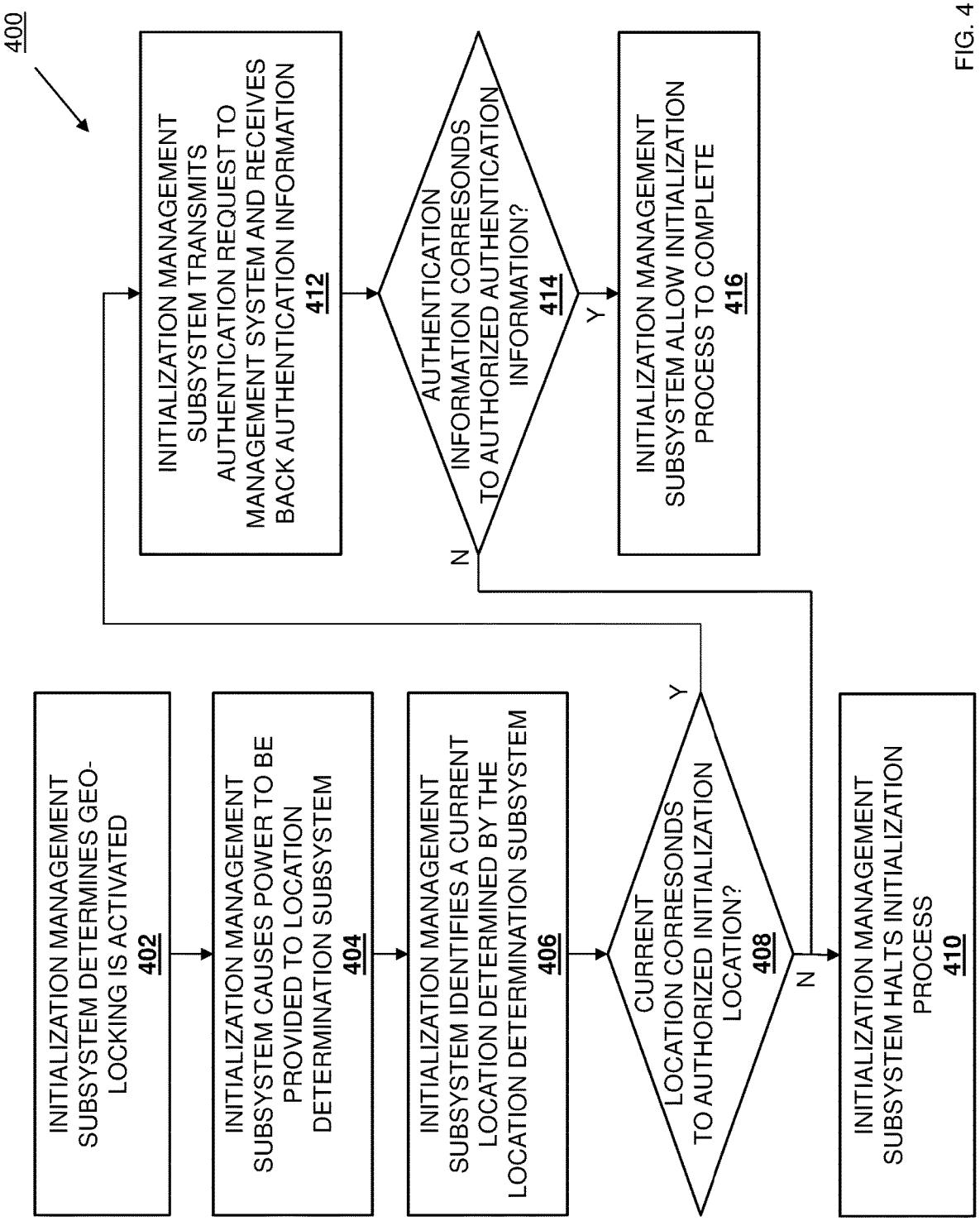
FIG. 4 is a flow chart illustrating an embodiment of a method for locking the initialization of a computing device based on its geographic location.

Referring now to FIG. 4, an embodiment of a method 400 for locking the initialization of a computing device based on its geographic location is illustrated. As discussed below, the systems and methods of the present disclosure provide for the locking of the initialization of a computing device based on its geographic location, which may be set by a customer to their location and activated following the manufacture of the computing device and prior to shipping or otherwise providing it to a customer, allowing that customer to be assured that that computing device has not been accessed when it arrives at their location. For example, the initialization geo-locking system of the present disclosure may include a chassis housing a location determination subsystem and an initialization management subsystem. During an initialization process that begins in response to receiving initialization power, the initialization management system determines that geo-locking is activated and, in response, causes power to be provided to the location determination subsystem and then subsequently identifies a first current location determined by the location determination subsystem. The initialization management subsystem then determines whether the first current location determined by the location determination subsystem corresponds to an authorized initialization location stored in the initialization management subsystem and, if so, halts the initialization process while, if not, allows the initialization process to complete. As such, the initialization of computing devices is prevented when they are outside a desired location, preventing malicious access to those computing devices if they are intercepted on their way to that location.

In an embodiment, during or prior to the method 400, the initialization geo-locking functionality of the present disclosure may be activated on the computing device 300. For example, a customer (e.g., a Telco customer in the specific examples provided below) may order the computing device 300 from a computing device provider and, during the manufacture, building, or other provisioning of the computing device 300, the initialization geo-locking functionality discussed below may be activated on the computing device 300. However, in other examples, the computing device 300 may be at a first location where it has previously been/currently being used, and may have the initialization geo-locking functionality discussed below activated prior to transporting the computing device 300 to a second location where it will subsequently be used. However, while a few specific examples of the utilization of the initialization geo-locking functionality of the present disclosure are described, one of skill in the art in possession of the present disclosure will recognize a wide variety of situations in which the initialization geo-locking functionality may be useful, and any of those situations are envisioned as falling within the scope of the present disclosure as well.

In an embodiment, the activation of the initialization geo-locking functionality may include storing an authorized initialization location in the initialization management database 308 and, in some situations, setting an initialization geo-locking activation flag or other indicator in the initialization management database 308 as well. Furthermore, in some embodiments, the activation of the initialization geo-locking functionality may include storing authorized authentication information in the initialization management database 308, which as discussed below may be used in some examples for initialization geo-locking multi-factor authentication operations. Further still, the activation of the initialization geo-locking functionality may include storing any of the cryptographic verification information (e.g., public keys, private keys, etc.) discussed below in the initialization management database 308.

In one specific example, during a computing device ordering process, a customer (e.g., a Telco customer in the specific examples provided below) may opt-in, purchase, or otherwise select activation of the initialization geo-locking functionality of the present disclosure (e.g., via a computing device purchasing website, over the phone, and/or in any of a variety other purchasing scenarios known in the art). As part of that activation, the customer may provide authorized initialization location information that may include a delivery address, business name and location, GPS coordinates, and/or any other location information that one of skill in the art in possession of the present disclosure would recognize as allowing for the functionality discussed below. In response to receiving the authorized initialization location information, the computing device provider/manufacturer may convert that authorized initialization location information into an authorized initialization location (e.g., the GPS coordinates, GNSS coordinates, and/or other location coordinates discussed below) and store that authorized initialization location in the initialization management database 308.

In another specific example, a user may activate the initialization geo-locking functionality of the present disclosure (e.g., in preparation to transport the computing device 300 to another location, and/or in any of a variety other computing device transfer scenarios known in the art). As part of that activation, the user may provide authorized initialization location information that may include a shipping address, business name and location, GPS coordinates, and/or any other location information that one of skill in the art in possession of the present disclosure would recognize as allowing for the functionality discussed below. In response to receiving the authorized initialization location information (e.g., via a Graphical User Interface (GUI) provided by the initialization management engine 304), the initialization management engine 304 may convert that authorized initialization location information into an authorized initialization location (e.g., the GPS coordinates, GNSS coordinates, and/or other location coordinates discussed below) and store that authorized initialization location in the initialization management database 308. However, while two specific examples of initialization geo-locking activation are described, one of skill in the art in possession of the present disclosure will appreciate that the initialization geo-locking functionality of the present disclosure may be activated in any of a variety of scenarios that will fall within the scope of the present disclosure as well.

In some embodiments, the initialization management database 308 may be included in a BIOS, a remote access controller device, or other initialization management subsystem, and thus the authorized initialization location may be stored in a BIOS, remote access controller device, or other initialization management subsystem. For example, the authorized initialization location may be stored in an erase-resistant portion of storage or memory in the BIOS, remote access controller device, or other initialization management subsystem, which may be provided by an erase-resistant Non-Volatile Read-Access Memory (NVRAM) region of the BIOS, a Read Protected Memory Block (RPMB) in silicon included in the remote access controller device, a storage area of the BIOS that does not allow for the erasure of information in response to an Non-Volatile Random Access Memory clear (NVRAM_CLR) operations or the removal of a Complementary Metal-Oxide-Semiconductor (CMOS) battery, and/or any other erase-resistant storage area that would be apparent to one of skill in the art in possession of the present disclosure.

In some embodiments, the authorized initialization location may be stored using one or more cryptographically signed certificates that one of skill in the art in possession of the present disclosure will recognize may be stored as described above. For example, one of skill in the art in possession of the present disclosure will appreciate how a cryptographically signed certificate including the authorized initialization location may be verified by the computing device provider/manufacturer, and/or may be uniquely bound to a private key (e.g., stored in the remote access controller device discussed above, a Trusted Platform Module (TPM) in the computing device 300, and/or in other secure locations that would be apparent to one of skill in the art in possession of the present disclosure). In the examples provided below, a specific use of a cryptographically signed certificates is described (e.g., the use of a root certificate with a public key associated with the private key used to sign the certificate that includes the authorized initialization location), but one of skill in the art in possession of the present disclosure will appreciate how, in practice, a chain of cryptographically signed certificates are typically used to perform similar functionality that will fall within the scope of the present disclosure as well.

In some embodiments, the storage of the authorized initialization location may operate as the setting of the initialization geo-locking activation flag or other indicator discussed above. For example, as discussed below, the presence of a cryptographically signed certificate including the authorized initialization location in the initialization management database 308 may be treated as an initialization geo-locking activation flag or other indicator that has been set. However, in other embodiments, the initialization geo-locking activation flag or other indicator may be set as a configuration item in the BIOS or remote access controller device discussed above. Furthermore, while a few specific examples are provided, one of skill in the art in possession of the present disclosure will appreciate how the activation of the initialization geo-locking functionality of the present disclosure may be indicated in a variety of manners that will fall within the scope of the present disclosure as well. Further still, as discussed below, the activation of the initialization geo-locking functionality of the present disclosure may be configured for one-time use (e.g., in association with a "first-boot" of the computing device 300 following its manufacture), or for regular use (e.g., upon any initialization of the computing device 300), and thus the setting of the initialization geo-locking activation flag or other indicator may be configured to be reversed or removed in some situations to enable one-time use, or may persist to enable regular use.

In some of the embodiment discussed below, the activation of the initialization geo-locking functionality of the present disclosure may also include the customer or user discussed above providing authorized authentication information that may be utilized in the initialization geo-locking multi-factor authentication operations discussed below, and one of skill in the art in possession of the present disclosure will appreciate how that authorized authentication information may be stored similarly as the authorized initialization location discussed above. As discussed in further detail below, the authorized authentication information may include a public key that may be utilized to verify a communication from a management system (i.e., with that communication being signed by a private key associated with that public key) that is associated with the customer or user, which allows that management system to confirm the computing device is in an authorized initialization location by only being accessible in that authorized initialization location, by identifying the authorized initialization location, and/or performing other actions that one of skill in the art in possession of the present disclosure would recognize as providing an additional factor of authentication of the location of the computing device.

As such, during or prior to the method 400, the computing device 300 has activated to perform the initialization geo-locking functionality of the present disclosure, which may include providing any of the initialization geo-locking information discussed above in the initialization management database 308, configuring the initialization management engine 304 to perform any of the initialization geo-locking functionality discussed below, and/or otherwise configuring the computing device 300 to operate as described herein. As such, one of skill in the art in possession of the present disclosure will appreciate how any computing device that is capable of the initialization geo-locking functionality of the present disclosure may have that functionality disabled in the event the security provided by that functionality is not needed or desired.

Figure 5:
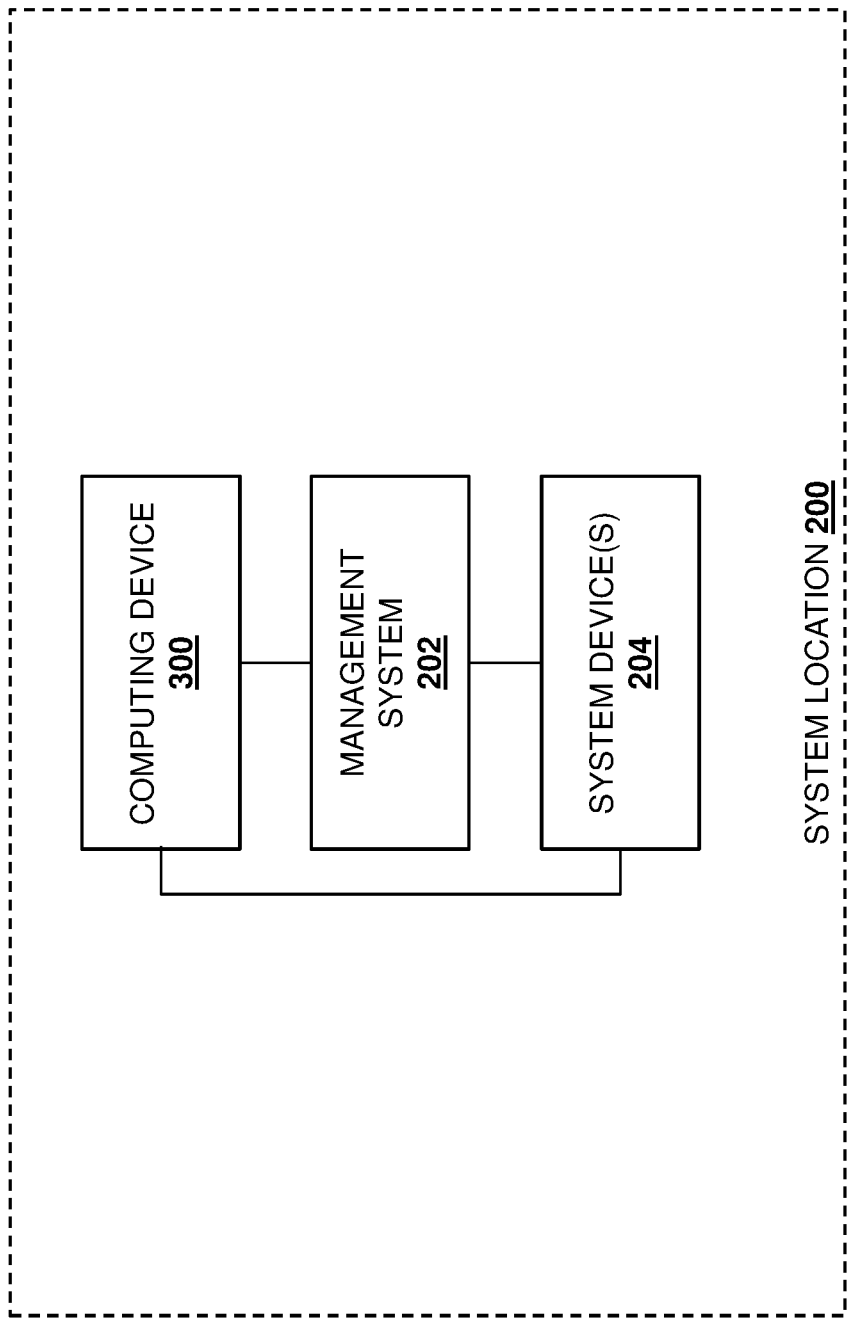
FIG. 5 is a schematic view illustrating an embodiment of the computing device of FIG. 3 provided in the system location of FIG. 2 during the method of FIG. 4.
Figure 6:
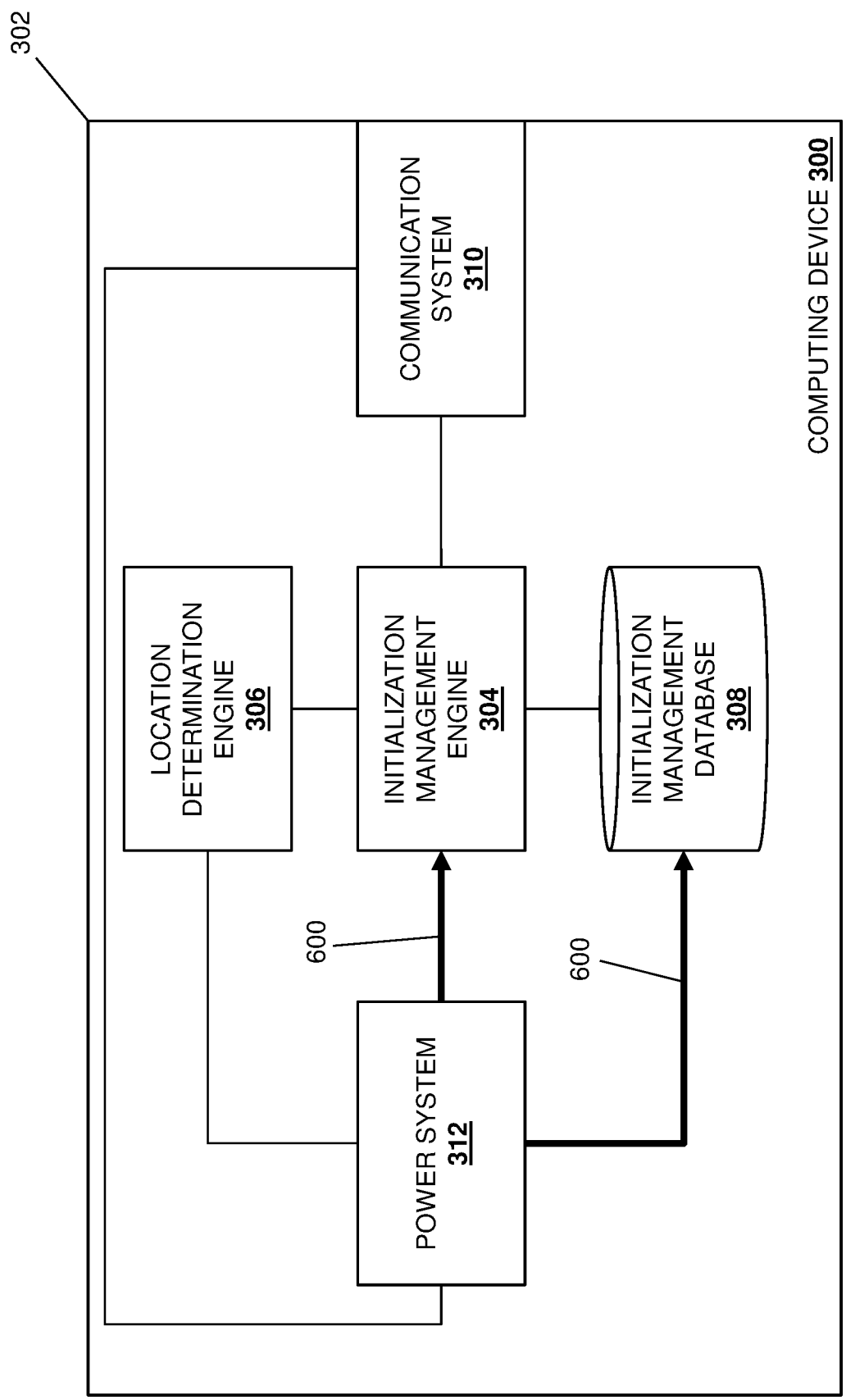
FIG. 6 is a schematic view illustrating an embodiment of the computing device of FIG. 3 operating during the method of FIG. 4.
Figure 7:
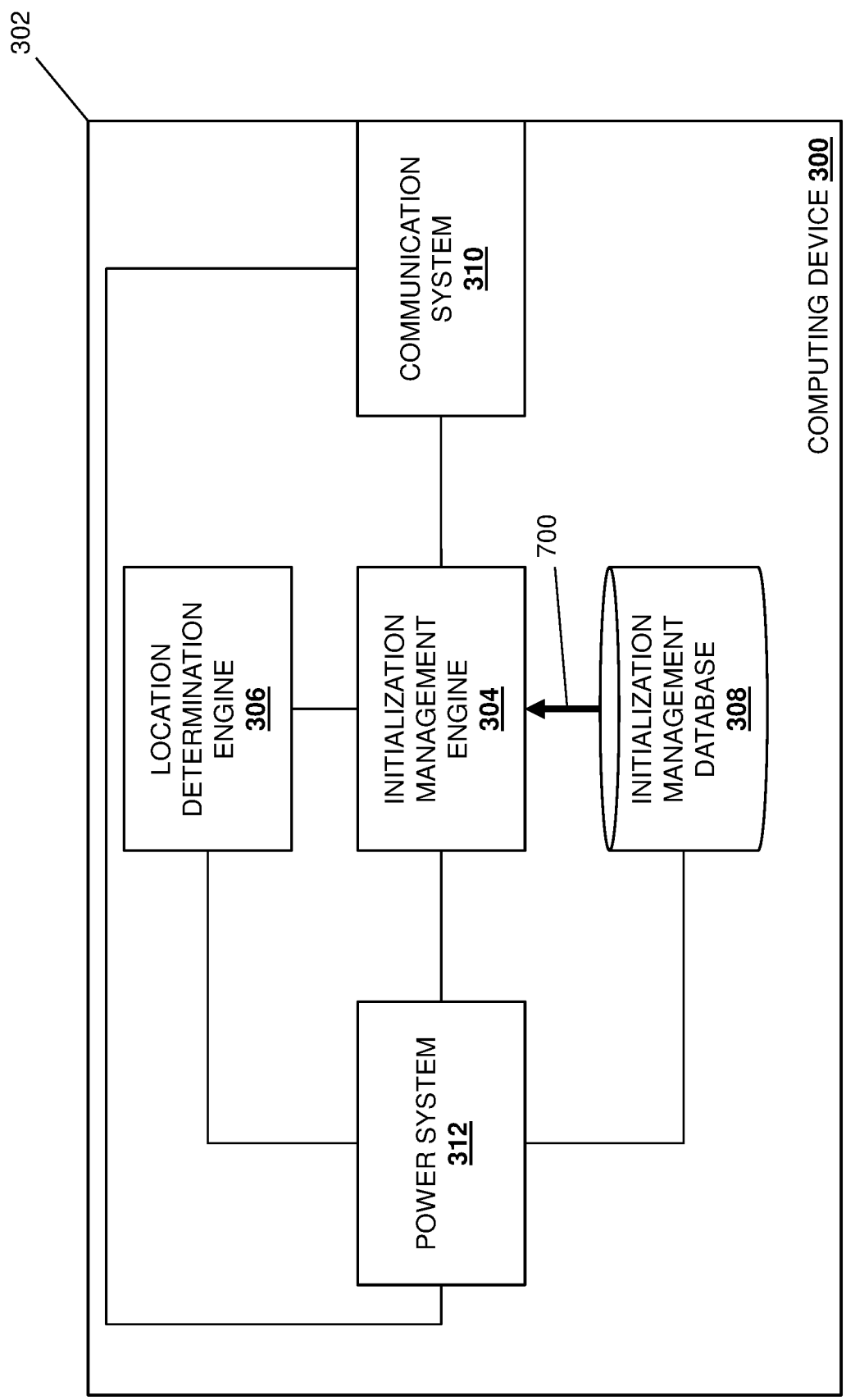
FIG. 7 is a schematic view illustrating an embodiment of the computing device of FIG. 3 operating during the method of FIG. 4.

The method 400 begins at block 402 where an initialization management subsystem determines geo-locking is activated. With reference to FIG. 5, the computing device 300 may be provided in the system location 200 and, in some embodiments, connected to the management system 202 and/or the system device(s) 204. Furthermore, with reference to FIG. 6, the computing device may be powered on, reset, and/or may otherwise begin an initialization process such that the power system 312 performs power provisioning operations 600 that include providing power to each of the initialization management engine 304 (e.g., to the processing system and memory system that provide it) and the initialization management database 308 (e.g., to the storage device that provides it). As will be appreciated by one of skill in the art in possession of the present disclosure, the initialization process may also include the loading of the BIOS (which may provide at least a portion of the initialization management engine 304 as discussed above). With reference to FIG. 7, in an embodiment of block 402, the initialization management engine 304 may then perform geo-locking activation determination operations 700 that may include accessing the initialization management database 308 and determining whether an initialization geo-locking flag or other indicator has been set. As will be appreciated by one of skill in the art in possession of the present disclosure, in the event an initialization geo-locking flag or other indicator has not been set, the initialization management engine 304 may allow the initialization process to complete and the computing device 300 to enter a runtime state (e.g., where an operating system in the computing device 300 takes over operation of the computing device 300).

As discussed above, in some embodiments, an initialization geo-locking activation flag or other indicator may be set as a configuration item in the BIOS or remote access controller device discussed above, and thus at block 402 a determination may be made that initialization geo-locking is activated in response to determining that initialization geo-locking activation flag or other indicator has been set in the initialization management database 308. However, as also discussed above, in other embodiments the presence of a cryptographically signed certificate including an authorized initialization location in the initialization management database 308 may be treated as an initialization geo-locking activation flag or other indicator that has been set, and thus at block 402 a determination may be made that initialization geo-locking is activated in response to determining that a cryptographically signed certificate including an authorized initialization location is stored in the initialization management database 308. However, while two specific examples are provided, one of skill in the art in possession of the present disclosure will appreciate how geo-locking activation may be identified in a variety of manners that will fall within the scope of the present disclosure as well.

Figure 8:
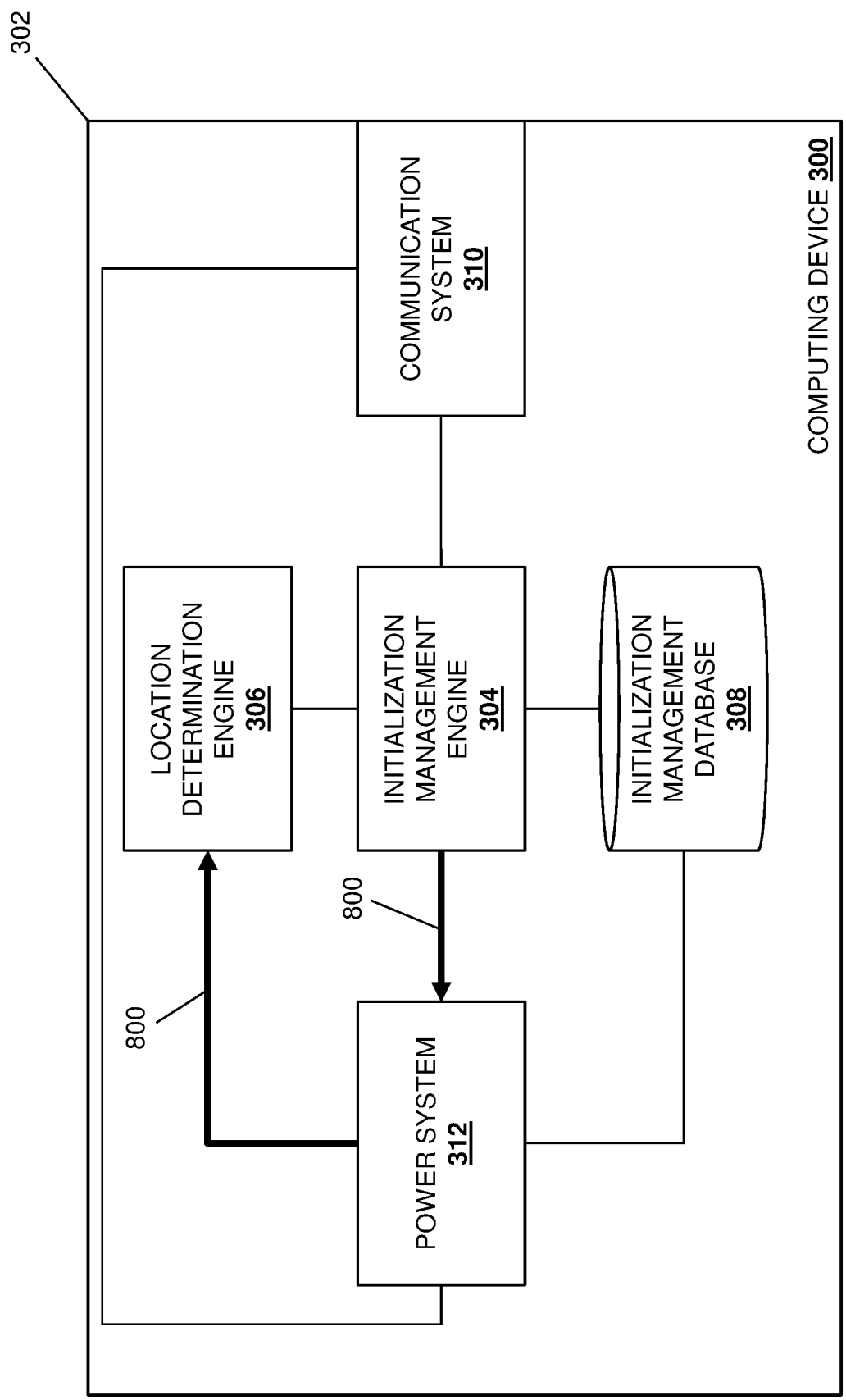
FIG. 8 is a schematic view illustrating an embodiment of the computing device of FIG. 3 operating during the method of FIG. 4.

The method 400 then proceeds to block 404 where the initialization management subsystem causes power to be provided to a location determination subsystem. With reference to FIG. 8, in an embodiment of block 404 and in response to determining that geo-locking is activated at block 402, the initialization management engine 304 may perform location determination subsystem powering operations 800 that may include instructing, configuring, and/or otherwise causing the power system 312 to provide power to the location determination engine 306 (e.g., to the processing system and memory system that provide it). As will be appreciated by one of skill in the art in possession of the present disclosure, in response to being provided power, the location determination engine 306 may power on and perform any of a variety of location determination operations that would be apparent to one of skill in the art in possession of the present disclosure.

For example, and as discussed above, the location determination engine 306 may include a GPS device, a GNSS (or other) augmentation system, and other location determination subsystems (e.g., the WIFI, Bluetooth, and/or cellular tower triangulation components discussed above, which may be included in the communication system 310 that may be powered by the power system at block 404 as well) in order to determine a current location of the location determination engine 306 and, thus, the computing device 300. As will be appreciated by one of skill in the art in possession of the present disclosure, the augmentation systems (e.g., GNSS augmentation systems, other GPS augmentation systems, etc.) may aid the GPS device when full "line-of-sight" is not available to GPS satellites, and may build on GNSS (or other ground-based augmentation services that provide location precision information) using WIFI, Bluetooth, cellular tower triangulation and/or other non-satellite communication technologies to enable relatively accurate determinations of current location. However, while a few specific examples are described, one of skill in the art in possession of the present disclosure will appreciate how the location determination engine 306 may determine its current location (and thus the current location of the computing device 300) in a variety of manners that will fall within the scope of the present disclosure as well.

Figure 9:
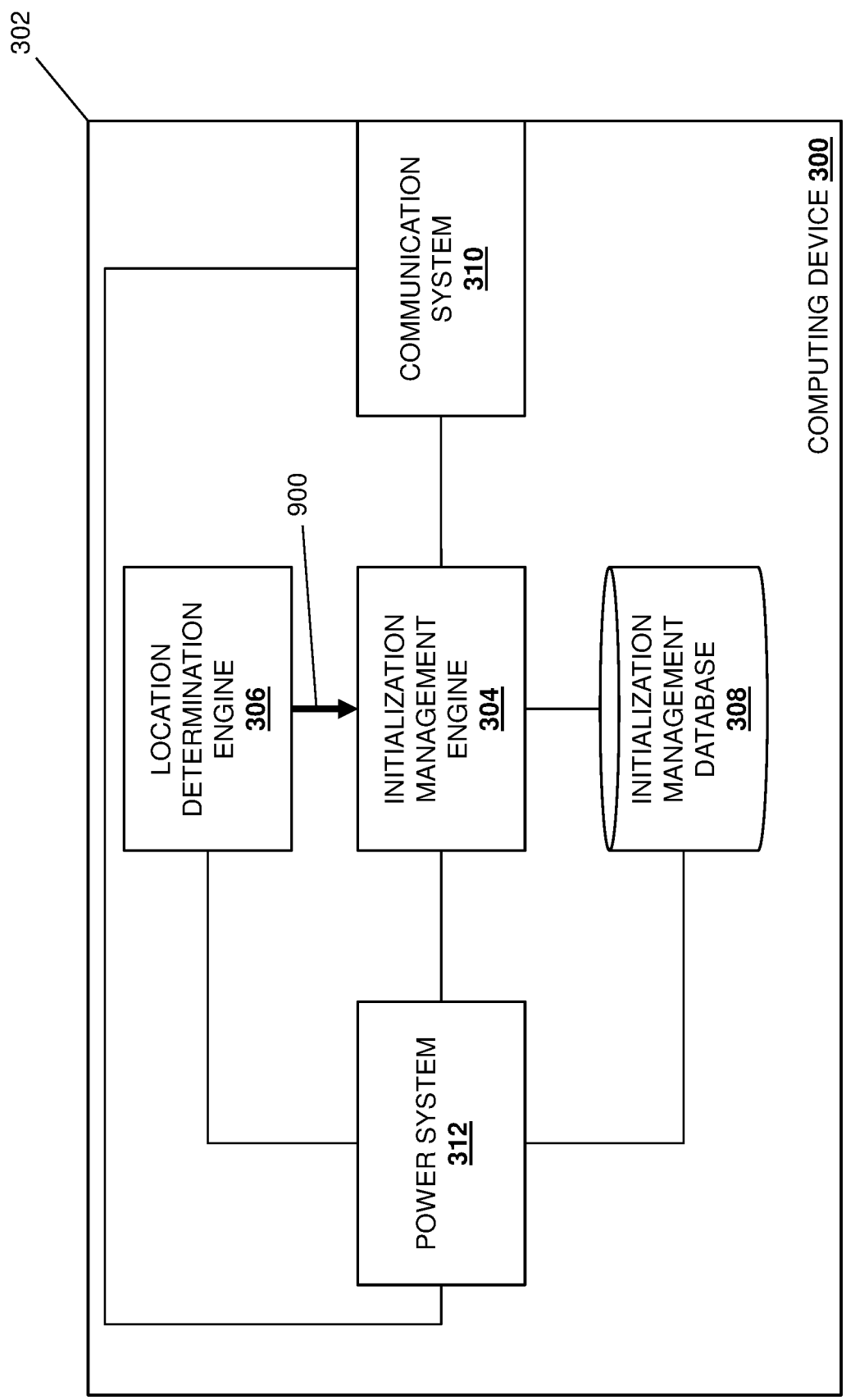
FIG. 9 is a schematic view illustrating an embodiment of the computing device of FIG. 3 operating during the method of FIG. 4.

The method 400 then proceeds to block 406 where the initialization management subsystem identifies a current location determined by the location determination subsystem. With reference to FIG. 9, in an embodiment of block 406, the initialization management engine 304 may perform current location identification operations 900 that include receiving or retrieving the current location determined by the location determination engine 306 as described above. As will be appreciated by one of skill in the art in possession of the present disclosure, in many embodiments, the current location determined by the location determination engine 306 and identified by the initialization management engine 304 at block 406 may be provided by GPS coordinates, GNSS coordinates, and/or other location coordinates that would be apparent to one of skill in the art in possession of the present disclosure. Furthermore, while described as including particular coordinates, one of skill in the art in possession of the present disclosure will appreciate that the current location determined by the location determination engine 306 may be identified as some converted location information such as the address, business name and location, and/or other location information discussed above while remaining within the scope of the present disclosure as well.

Figure 10:
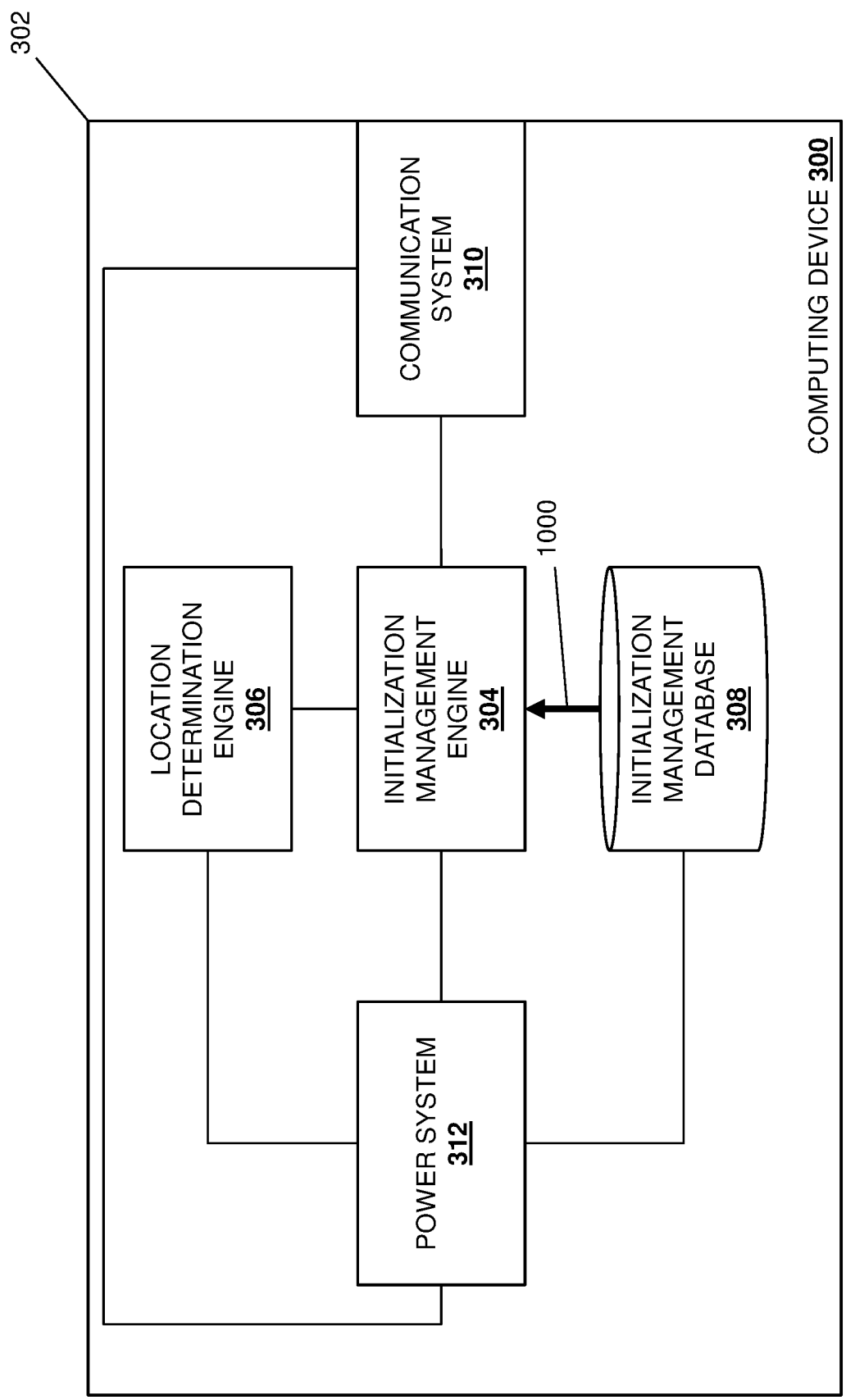
FIG. 10 is a schematic view illustrating an embodiment of the computing device of FIG. 3 operating during the method of FIG. 4.

The method 400 then proceeds to decision block 408 where it is determined whether the current location corresponds to an authorized initialization location. With reference to FIG. 10, in an embodiment of decision block 408, the initialization management engine 304 may perform authorized initialization location retrieval operations 1000 that may include retrieving the authorized initialization location from the initialization management database 308. For example, as discussed above, the authorized initialization location may be included in a cryptographically signed certificate that is stored in the initialization management database 308, and thus the initialization management engine 304 may retrieve that cryptographically signed certificate from the initialization management database 308, access a root certificate including a public key in the initialization management database 308, and use that public key to verify whether the cryptographically signed certificate was signed with an authorized private key, which one of skill in the art in possession of the present disclosure will recognize allows the initialization management engine 304 to determine whether the authorized initialization location in that cryptographically signed certificate can be trusted. In specific embodiments, decision block 408 may be performed by the BIOS itself, or may be performed by a combination of the BIOS and the remote access controller device (e.g., the remote access controller device may validate the cryptographically signed certificate and provide that validation to the BIOS). For example, in some computing devices, the location determination engine 306 (e.g., which may be soldered to the motherboard or connected to the motherboard as an add-on card) may only be accessible to the BIOS, and thus the BIOS may need to identify the current location detected by the location determination engine 306, but may "offload" the validation of the cryptographically signed certificate and its authorized initialization location to the remote access controller device. However, computing devices that allow a remote access controller device access to the location determination engine 306 are envisioned as falling within the scope of the present disclosure, and thus current location identification operations performed by the remote access controller device will fall within its scope as well.

As will be appreciated by one of skill in the art in possession of the present disclosure, in the event the initialization management engine 304 determines that the cryptographically signed certificate was not signed with an authorized private key, the initialization management engine 304 may halt the initialization process and, in some examples, provide a message for display to a user (e.g., via the display 110 discussed above with reference to FIG. 1) identifying the reason(s) for halting the initialization process. However, in the event the initialization management engine 304 determines that the cryptographically signed certificate was signed with an authorized private key, then the initialization management engine 304 may compare the authorized initialization location included in that cryptographically signed certificate with the current location determined by the location determination engine 306 and identified by the initialization management engine 304 at block 406.

In some examples, the determination at decision block 408 of whether the current location corresponds to the authorized initialization location may require an exact match of those locations (e.g., matching business name/location, matching address, etc.). However, in other examples, the determination at decision block 408 of whether the current location corresponds to the authorized initialization location may require those locations be within some range, distance, or other measurements of each other (e.g., sets of location coordinates may match if they are within a range, distance, radius, or other measurement of each other). At will be appreciated by one of skill in the art in possession of the present disclosure, in such examples the security provided by the initialization geo-locking system of the present disclosure may be adjusted by modifying the range, distance, radius, or other measurements that allow the current location to correspond to the authorized initialization location. However, while particular techniques for accessing an authorized initialization location and comparing it to an identified current location have been described, one of skill in the art in possession of the present disclosure will appreciate that authorized initialization locations may be accessed in other manners while remaining within the scope of the present disclosure as well.

If, at decision block 408, it is determined that the current location does not correspond to an authorized initialization location, the method 400 proceeds to block 410 where the initialization management subsystem halts the initialization process. In an embodiment, at block 410 and in response to determining that the current location does not correspond to the authorized initialization location at decision block 408, the initialization management engine 304 may halt the initialization process and, in some examples, provide a message for display to a user (e.g., via the display 110 discussed above with reference to FIG. 1) identifying the reason(s) for halting the initialization process. As such, attempts to initialize the computing device 300 at a location other than the authorized initialization location may result in the initialization process being halted, thus preventing access to the computing device 300 in its runtime state, and assuring the customer or user of the computing device 300 that it has not been initialized and accessed prior to arriving at the authorized initialization location.

In some embodiments of the present disclosure, if at decision block 408 it is determined that the current location corresponds to an authorized initialization location, the method 400 may proceed directly to block 416 where the initialization management subsystem allows the initialization process to complete, discussed in further detail below. As will be appreciated by one of skill in the art in possession of the present disclosure, such embodiments may provide sufficient security in many situations, and thus the blocks 412 and 414 of the method 400 discussed below may be skipped in those embodiments. However, in relatively high security situations, an initialization geo-locking multi-factor authentication process may be enabled in other embodiments of the present disclosure via the performance of blocks 412 and 414 of the method 400 discussed below. For example, it may be possible to "spoof" a location signal (e.g., GPS signals, GNSS signals, etc.) provided to the location determination engine 306 (e.g., by "hijacking" the frequency of a GPS satellite and mimicking that satellite in order to cause the GPS device including the location determination engine 306 to detect a particular location that is not its actual physical current geographic location), and thus additional confirmations that the computing device 300 is actually physically located at the authorized initialization location may be warranted. In specific examples, the remote access controller device may perform the initialization geo-locking multi-factor authentication process described herein.

Figure 11:
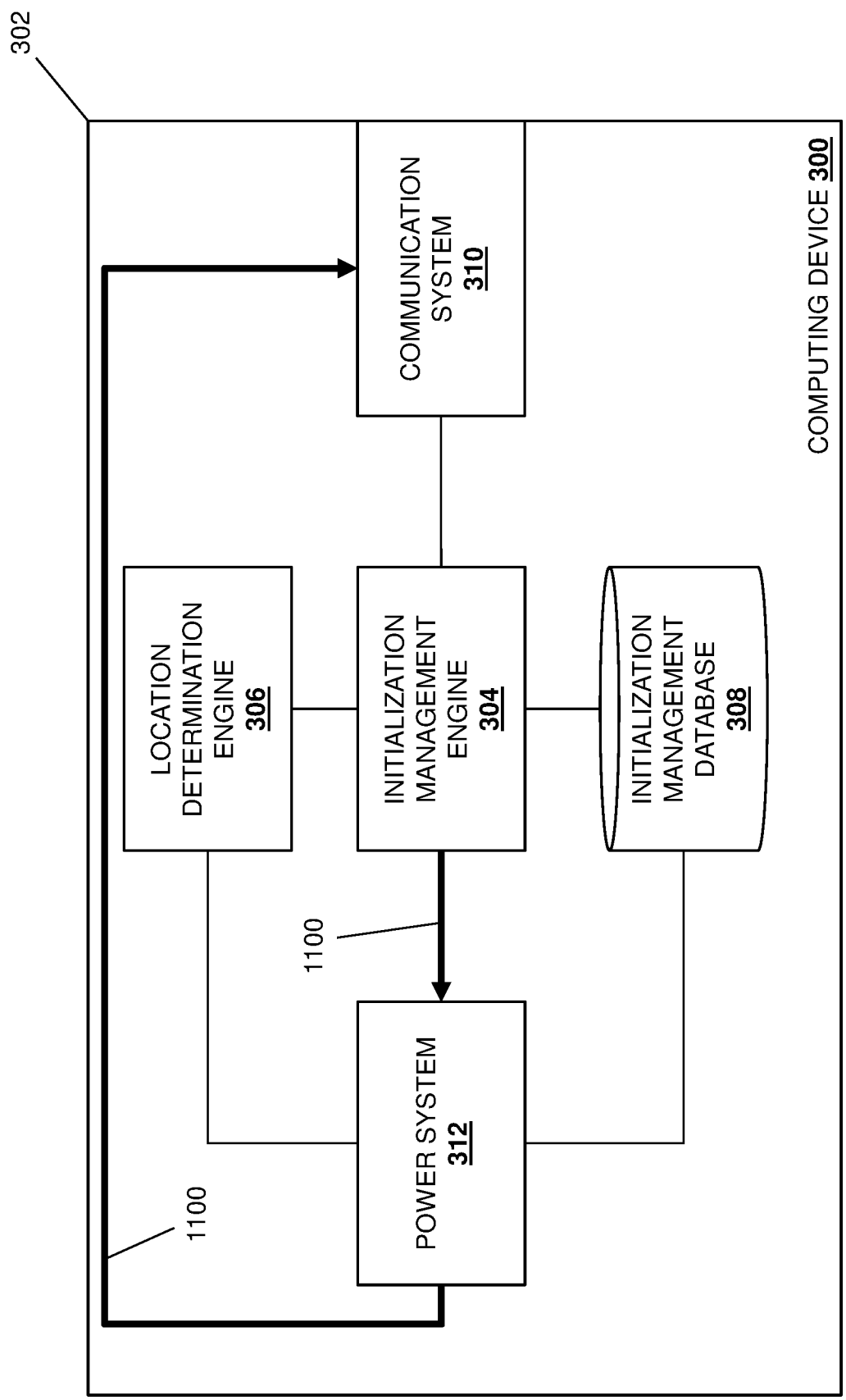
FIG. 11 is a schematic view illustrating an embodiment of the computing device of FIG. 3 operating during the method of FIG. 4.

As such, if at decision block 408 it is determined that the current location corresponds to an authorized initialization location, the method 400 may proceed to block 412 where the initialization management subsystem transmits an authentication request to a management system and receives back authentication information. With reference to FIG. 11, in an embodiment of block 412 and following a determination that the current location corresponds to the authorized initialization location, the initialization management engine 304 may perform communication system power provision operations 1100 that may include instructing, configuring, and/or otherwise causing the power system 312 to provide power to the communication system 310. However, as discussed above, in some embodiments power may have previously been enabled to the communication system 310 to power components (e.g., WIFI, Bluetooth, etc.) for use by the location determination engine 306, and thus in those embodiments the performance of the communication system power provision operations 1100 may be skipped (i.e., as they are already being performed).

Figure 12A:
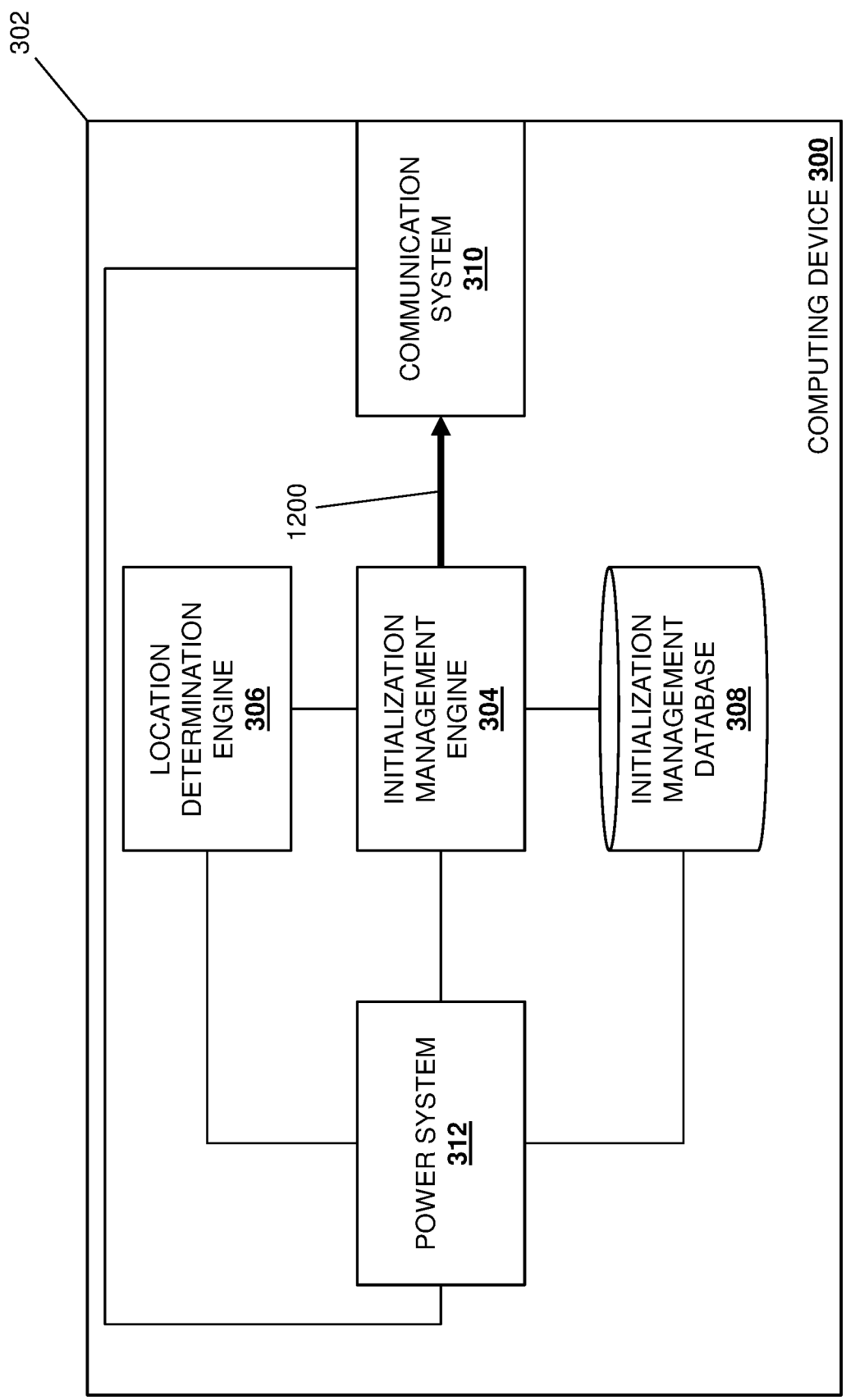
FIG. 12A is a schematic view illustrating an embodiment of the computing device of FIG. 3 operating during the method of FIG. 4.
Figure 12B:
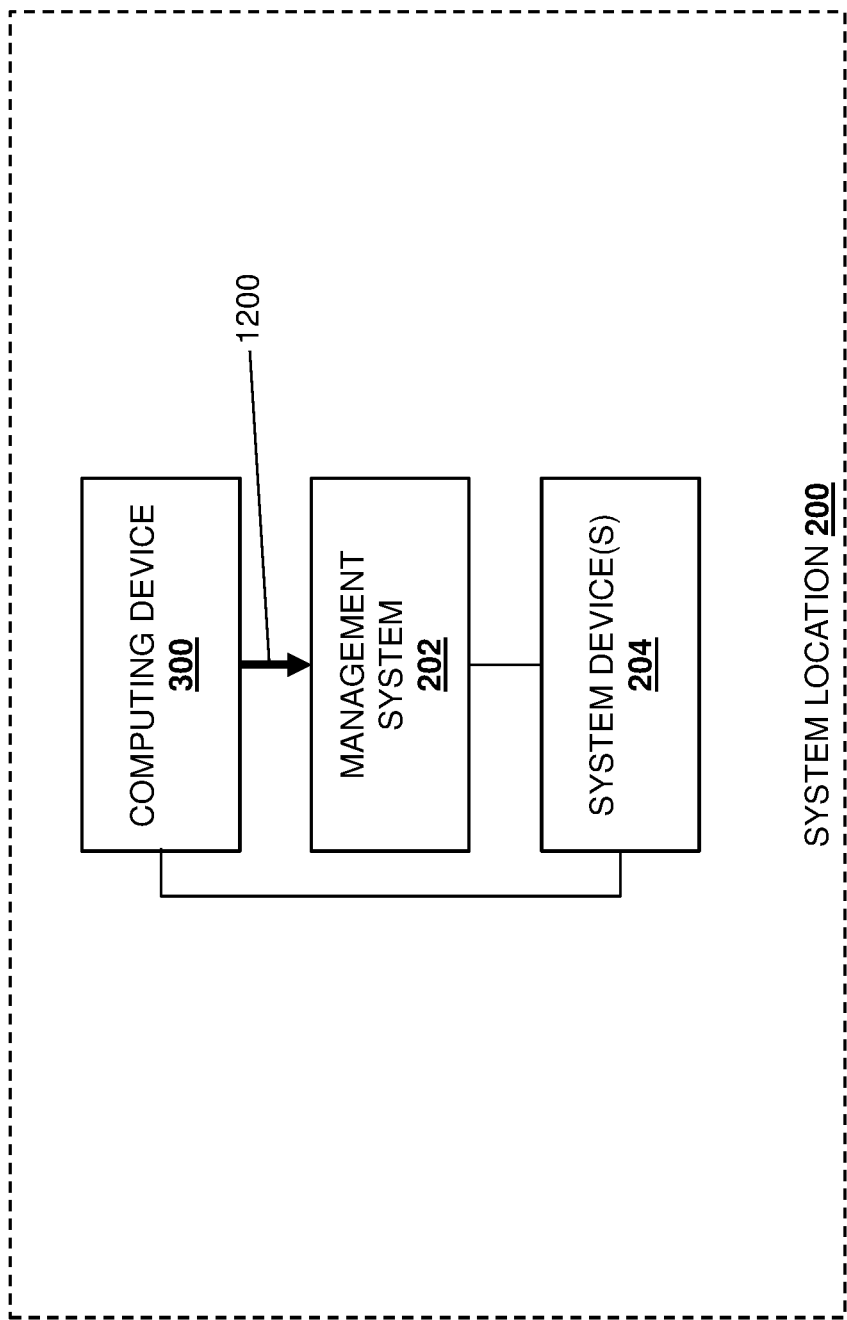
FIG. 12B is a schematic view illustrating an embodiment of the computing device of FIG. 3 in the system location of FIG. 2 operating during the method of FIG. 4.
Figure 12C:
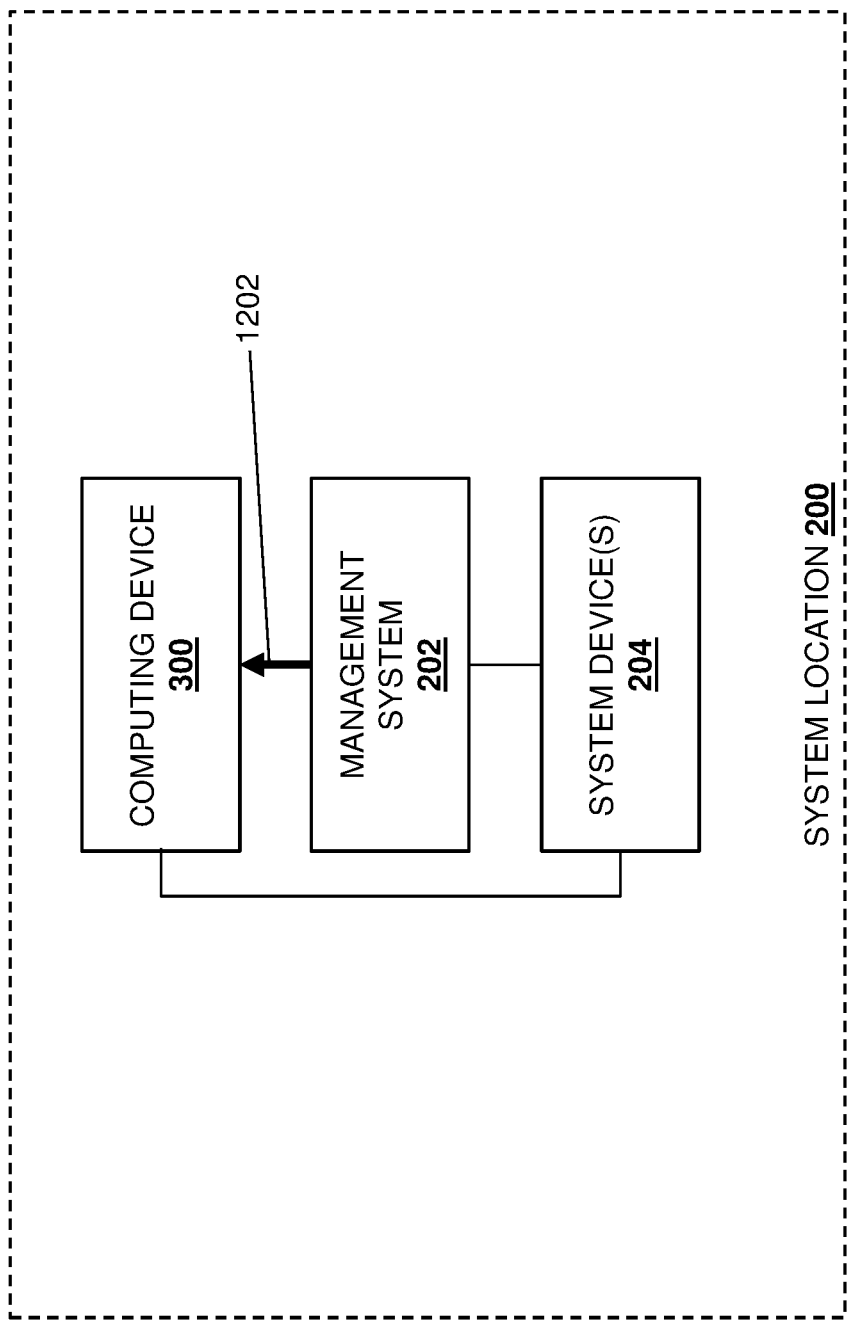
FIG. 12C is a schematic view illustrating an embodiment of the computing device of FIG. 3 in the system location of FIG. 2 operating during the method of FIG. 4.
Figure 12D:
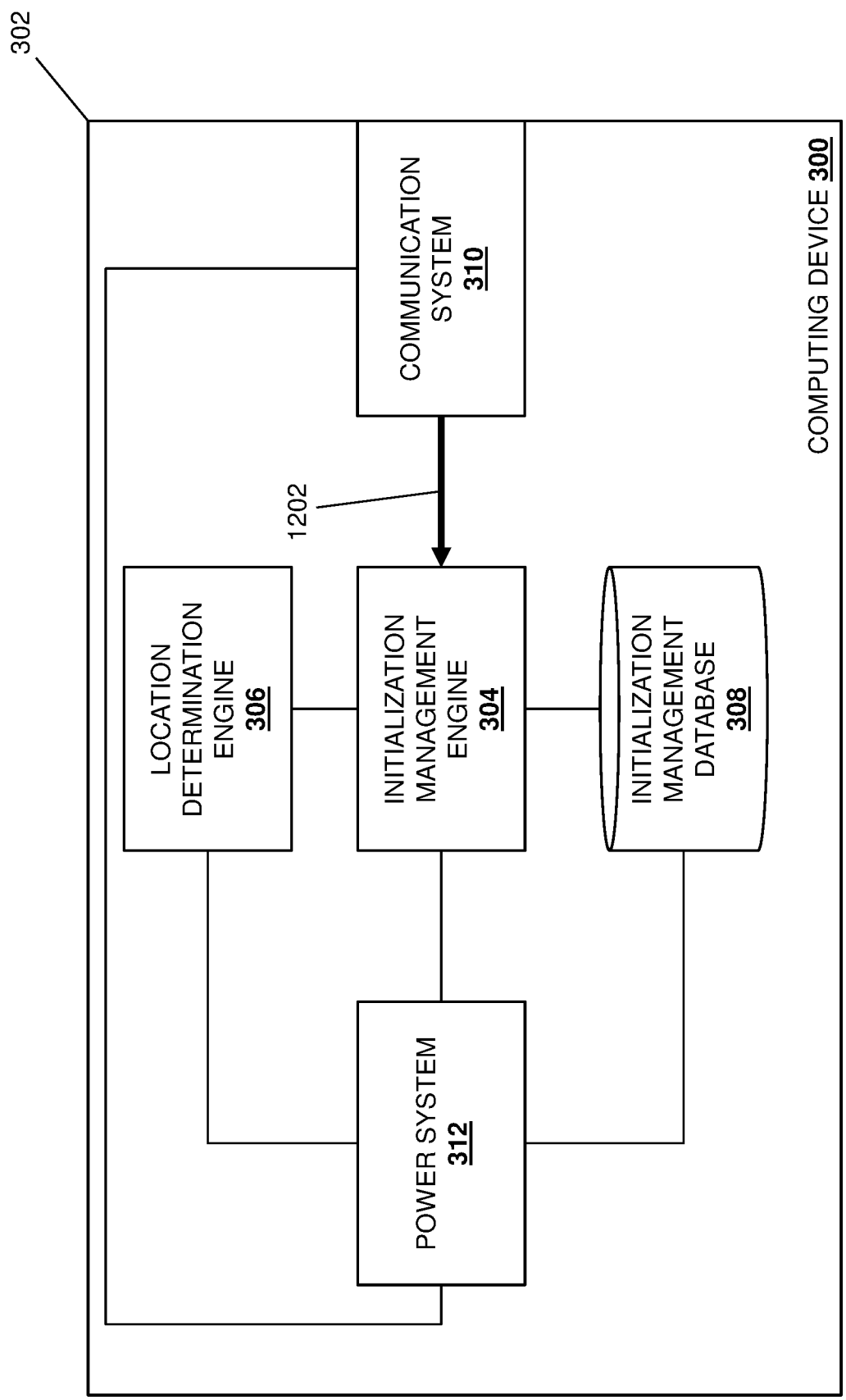
FIG. 12D is a schematic view illustrating an embodiment of the computing device of FIG. 3 operating during the method of FIG. 4.

With reference to FIGS. 12A and 12B, the initialization management engine 304 may then perform authentication request transmission operations 1200 that include transmitting an authentication request via the communication system 310 and to the management system 202, and one of skill in the art in possession of the present disclosure will appreciate how the authentication request may be provided using any authentication request information and in any authentication request format required to provide for the functionality discussed below. With reference to FIGS. 12C and 12D, in response to receiving the authentication request, the management system 202 may then perform authentication information transmission operations 1202 that include transmitting authentication information that is received by the initialization management engine 304 via the communication system 310. In the examples below, the authentication information transmitted by the management system 202 is signed using a private key that is associated with a public key stored in the initialization management database 208 of the computing device 300, and in some specific examples may include a location at which the management system expects the computing device 300 to be. However, authentication information may be provided using any types of authentication information and in any authentication information format required to provide for the functionality discussed below.

Figure 13:
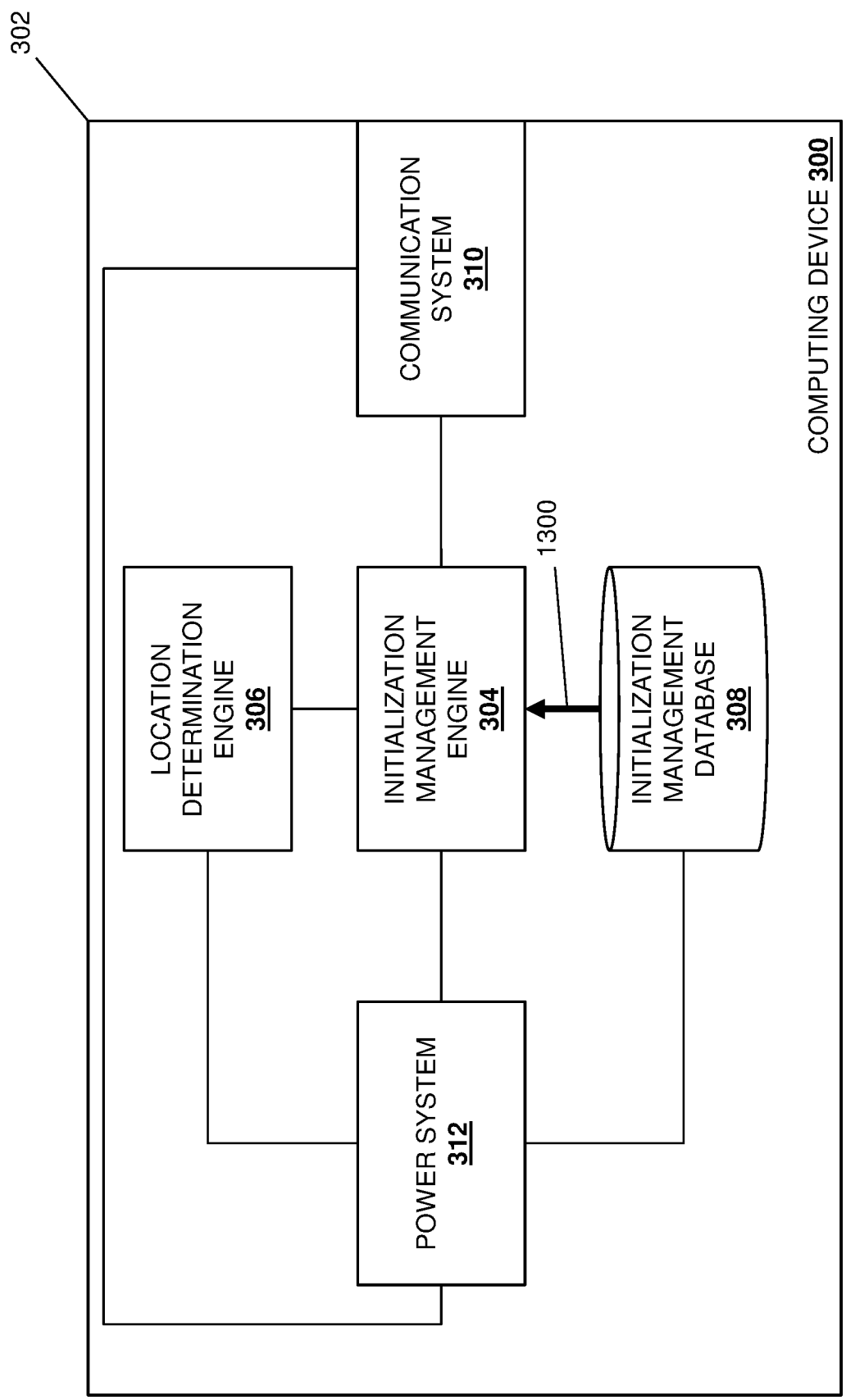
FIG. 13 is a schematic view illustrating an embodiment of the computing device of FIG. 3 operating during the method of FIG. 4.

The method 400 then proceeds to decision block 414 where it is determined whether the authentication information corresponds to authorized authentication information. With reference to FIG. 13, in an embodiment of decision block 414, the initialization management engine 304 may perform authorized authentication information retrieval operations 1300 that may include retrieving the authorized authentication information from the initialization management database 308. For example, as discussed above, the authorized authentication information may be a public key that the initialization management engine 304 may use to determine whether the authentication information was signed with an authorized private key, which one of skill in the art in possession of the present disclosure will recognize allows the initialization management engine 304 to determine whether the authorized authentication information can be trusted.

As will be appreciated by one of skill in the art in possession of the present disclosure, in the event the initialization management engine 304 determines that the authentication information was not signed with an authorized private key, the initialization management engine 304 may halt the initialization process and, in some examples, provide a message for display to a user (e.g., via the display 110 discussed above with reference to FIG. 1) identifying the reason(s) for halting the initialization process. However, in some embodiments and in the event the initialization management engine 304 determines that the authentication information was signed with an authorized private key, then the initialization management engine 304 may determine that the authentication information corresponds to the authorized authentication information. For example, in some embodiments the system location 200 may be a "closed" location, may include a Local Area Network (LAN) that is not accessible via the Internet or other networks, or otherwise may include features that allow the connection to a device at that system location 200 to indicate that the computing device 300 device is located at the system location 200. As such, the determination that any message (i.e., the authentication information) was signed with the private key corresponding to the public key stored in its initialization management database 308 will indicate to the initialization management engine 304 that it is at the same location as the "authorized" management system 202 (i.e., that has access to that private key), and thus provides an additional factor indicating that the computing device 300 is at the authorized initialization location.

In other embodiments and in the event the initialization management engine 304 determines that the authentication information was signed with an authorized private key, then the initialization management engine 304 may compare the location identified in that authentication information to the current location and authorized initialization location discussed above. For example, in some embodiments the system location 200 may be accessible via the Internet or other networks such that a management system (similar to the management system 202) may be accessed remotely. As such, the determination that any message (i.e., the authentication information) was signed with the private key corresponding to the public key stored in its initialization management database 308 will indicate to the initialization management engine 304 that a location in the authentication information provided by the management system 202 can be trusted, and thus provides an additional factor indicating that the computing device 300 is at the authorized initialization location Similarly as described above, the determination of whether the location identified in that authentication information corresponds to the current location and the authorized initialization location may require an exact match of those locations (e.g., matching business name/location, matching address, etc.). However, in other examples, the determination of whether the location identified in that authentication information corresponds to the current location and the authorized initialization location may require those locations be within some range, distance, radius, or other measurements of each other (e.g., sets of location coordinates may match if they are within a range, distance, radius, or other measurement of each other). At will be appreciated by one of skill in the art in possession of the present disclosure, in such examples the security provided by the initialization geo-locking system of the present disclosure may be adjusted by modifying the range, distance, radius, or other measurements that allow the location identified in that authentication information to correspond to the current location and the authorized initialization location. However, while particular techniques for accessing authorized authentication information and comparing it provided authentication information have been described, one of skill in the art in possession of the present disclosure will appreciate that authorized authentication information may be accessed in other manners while remaining within the scope of the present disclosure as well If, at decision block 414, it is determined that the authentication information does not correspond to authorized authentication information, the method 400 proceeds to block 410 where the initialization management subsystem halts the initialization process. Similarly as described above, at block 410 and in response to determining that the authentication information does not correspond to the authorized authentication information at decision block 414, the initialization management engine 304 may halt the initialization process and, in some examples, provide a message for display to a user (e.g., via the display 110 discussed above with reference to FIG. 1) identifying the reason(s) for halting the initialization process. As such, attempts to initialize the computing device 300 at a location other than the authorized initialization location may result in the initialization process being halted, thus preventing access to the computing device 300 in its runtime state, and assuring the customer or user of the computing device 300 that it has not been initialized and access prior to arriving at the authorized initialization location.

If at decision block 414, it is determined that the authentication information corresponds to authorized authentication information, the method 400 proceeds to block 416 where the initialization management subsystem allows the initialization process to complete. In an embodiment, at block 416 and in response to determining that the current location corresponds to the authorized initialization location at decision block 408 or determining that the authentication information corresponds to the authorized authentication information at decision block 414, the initialization management engine 304 may allow the initialization process to complete. As such, in situations in which the initialization management engine 304 is provided by the BIOS, the BIOS may complete the initialization operations such that the computing device 300 enters a runtime state in which it is controlled by an operating system. Thus, attempts to initialize the computing device 300 at an authorized initialization location will succeed, thus allowing access to the computing device 300 in its runtime state once it is located at the authorized initialization location.

As discussed above, in some situations the initialization geo-locking functionality of the present disclosure may be configured for one-time use (e.g., in association with a "first-boot" of the computing device 300 following its manufacture). As such, in such situations and following the first successful initialization of the computing device 300 at block 416 immediately subsequent to its manufacture and shipping/provisioning to a customer location, the initialization geo-locking functionality may be disabled via an instruction, or via removal of the initialization geo-locking flag by, for example, deleting the cryptographically signed certificate including the authorized initialization location from the initialization management database 308, removing the initialization geo-locking flag provided as a configuration item in the BIOS or remote access controller device, and/or performing a variety of other flag removal operations that would be apparent to one of skill in the art in possession of the present disclosure. However, in embodiments in which the initialization geo-locking functionality of the present disclosure is configured for regular use (e.g., upon any initialization of the computing device 300), the initialization geo-locking flag may persist to enable initialization geo-locking functionality on subsequent initializations (e.g., when the computing device is power cycled, reset, etc.)

As will be appreciated by one of skill in the art in possession of the present disclosure, the method 400 may be performed in a first iteration in which the computing device 300 is located at a first location that is not an authorized initialization location and thus the initialization process is halted, followed by its performance in a second iteration in which the computing device 300 is located at a second location that is an authorized initialization location and thus the initialization process is allowed. Depending on the "one-time" or regular use setting for the initialization geo-locking functionality, that initialization geo-locking functionality may be disabled or may be performed on any subsequent initialization.

Thus, systems and methods have been described that provide for the locking of the boot of a server based on its geographic location, which may be set by a customer to their location and activated following the manufacture of the server prior to shipping or otherwise providing it to a customer, allowing that customer to be assured that that server has not been accessed when it arrives at their location.

For example, the boot geo-locking system of the present disclosure may include a chassis housing a GPS subsystem and a BIOS. During a boot process that begins in response to being powered on, the BIOS determines that geo-locking is activated and, in response, causes power to be provided to the GPS subsystem and then subsequently identifies a first current location determined by the GPS subsystem. The BIOS then determines whether the first current location determined by the GPS subsystem corresponds to an authorized boot location stored in the BIOS and, if so, halts the boot process while, if not, allows the boot process to complete. As such, the boot of servers is prevented when they are outside a desired location, preventing malicious access to those servers if they are intercepted on their way to that location.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An initialization geo-locking system, comprising:
   a chassis;
   a location determination subsystem that is located in the chassis;
   an initialization management subsystem that is located in the chassis and coupled to the location determination subsystem, wherein the initialization management subsystem is configured, during a first initialization process that begins in response to receiving initialization power, to:
   determine that geo-locking is activated;
   cause, in response to determining that geo-locking is activated, power to be provided to the location determination subsystem;
   identify, subsequent to the power being provided to the location determination subsystem, a first current location determined by the location determination subsystem;
   determine that the first current location corresponds to an authorized initialization location stored in the initialization management subsystem to obtain a first geo-locking authentication factor;
   transmit, in response to obtaining the first geo-locking authentication factor, a second geo-locking authentication factor request to a management system;
   receive, from the management system in response to transmitting the second geo-locking authentication factor request, second geo-locking authentication factor information;
   determine that the second geo-locking authentication factor information corresponds to authorized authentication information stored in the initialization management subsystem to obtain a second geo-locking authentication factor; and
   allow, in response to obtaining the first geo-locking authentication factor and the second geo-locking authentication factor, the first initialization process to complete.

2. The system of claim 1, wherein the second geo-locking authentication factor information includes a management system expected location, and wherein the initialization management subsystem determines that the second geo-locking authentication factor information corresponds to the authorized authentication information by determining that the management system expected location corresponds to the current location and the authorized initialization location.

3. The system of claim 1, wherein initialization management subsystem is configured to:
   deactivate, in response to allowing the first initialization process to complete, the geo-locking.

4. The system of claim 1, wherein the second geo-locking authentication factor information includes a signed second geo-locking authentication factor message, and wherein the initialization management subsystem is configured to:
   verify, using a management system public key that provides the authorized authentication information and that is associated with the management system that is known to be provided at a closed location, the signed second geo-locking authentication factor message to obtain the second geo-locking authentication factor.

5. The system of claim 1, wherein the initialization management subsystem is configured, during the first initialization process, to:
   verify, in response to identifying the first current location determined by the location determination subsystem, the authorized initialization location using at least one cryptographically signed certificate.

6. The system of claim 1, wherein the initialization management subsystem is configured, during a second initialization process that is subsequent to the first initialization process and that begins in response to receiving initialization power, to:
   determine that geo-locking is activated;
   cause, in response to determining that geo-locking is activated, power to be provided to the location determination subsystem;
   identify, subsequent to the power being provided to the location determination subsystem, a second current location determined by the location determination subsystem;
   determine that the second current location determined by the location determination subsystem does not correspond to the authorized initialization location stored in the initialization management subsystem; and
   halt, in response to determining that the second current location does not correspond to the authorized initialization location, the second initialization process.

7. An Information Handling System (IHS), comprising:
   a processing system; and
   a memory system that is coupled to the processing system and that includes instructions that, when executed by the processing system, cause the processing system to provide an initialization management engine that is configured, during a first initialization process that begins in response to receiving initialization power, to:
   determine that geo-locking is activated;
   cause, in response to determining that geo-locking is activated, power to be provided to a location determination subsystem;
   identify, subsequent to the power being provided to the location determination subsystem, a first current location determined by the location determination subsystem;
   determine that the first current location corresponds to an authorized initialization location stored in an initialization management database to obtain a first geo-locking authentication factor;

transmit, in response to obtaining the first geo-locking authentication factor, a second geo-locking authentication factor request to a management system;

receive, from the management system in response to transmitting the second geo-locking authentication factor request, second geo-locking authentication factor information;

determine that the second geo-locking authentication factor information corresponds to authorized authentication information stored in the initialization management subsystem to obtain a second geo-locking authentication factor; and allow, in response to obtaining the first geo-locking authentication factor and the second geo-locking authentication factor, the first initialization process to complete.

8. The IHS of claim 7, wherein the second geo-locking authentication factor information includes a management system expected location, and wherein the initialization management subsystem determines that the second geo-locking authentication factor information corresponds to the authorized authentication information by determining that the management system expected location corresponds to the current location and the authorized initialization location.

9. The IHS of claim 7, wherein initialization management engine is configured to:
deactivate, in response to allowing the first initialization process to complete, the geo-locking.

10. The IHS of claim 7, wherein the second geo-locking authentication factor information includes a signed second geo-locking authentication factor message, and wherein the initialization management subsystem is configured to:
verify, using a management system public key that provides the authorized authentication information and that is associated with the management system that is known to be provided at a closed location, the signed second geo-locking authentication factor message to obtain the second geo-locking authentication factor.

11. The IHS of claim 10, wherein the closed location includes a Local Area Network (LAN) that is not accessible via another network.

12. The IHS of claim 7, wherein the initialization management engine is configured, during the first initialization process, to:
verify, in response to identifying the first current location determined by the location determination subsystem, the authorized initialization location using at least one cryptographically signed certificate.

13. The IHS of claim 7, wherein the initialization management engine is configured, during a second initialization process that is subsequent to the first initialization process and that begins in response to receiving initialization power, to:
determine that geo-locking is activated;
cause, in response to determining that geo-locking is activated, power to be provided to the location determination subsystem;
identify, subsequent to the power being provided to the location determination subsystem, a second current location determined by the location determination subsystem;
determine that the second current location determined by the location determination subsystem does not corresponds to the authorized initialization location stored in the initialization management subsystem; and halt, in response to determining that the second current location does not corresponds to the authorized initialization location, the second initialization process.

14. A method for locking the initialization of a computing device based on its geographic location, comprising:
determining, by an initialization management subsystem during a first initialization process, that geo-locking is activated;
causing, by the initialization management subsystem during the first initialization process and in response to determining that geo-locking is activated, power to be provided to a location determination subsystem;
identifying, by the initialization management subsystem during the first initialization process and subsequent to the power being provided to the location determination subsystem, a first current location determined by the location determination subsystem;
determining, by the initialization management subsystem during the first initialization process, that the first current location corresponds to an authorized initialization location stored in an initialization management database to obtain a first geo-locking authentication factor;
transmitting, by the initialization management subsystem in response to obtaining the first geo-locking authentication factor, a second geo-locking authentication factor request to a management system;
receiving, by the initialization management subsystem from the management system in response to transmitting the second geo-locking authentication factor request, second geo-locking authentication factor information;
determining, by the initialization management subsystem, that the second geo-locking authentication factor information corresponds to authorized authentication information stored in the initialization management subsystem to obtain a second geo-locking authentication factor; and
allowing, by the initialization management subsystem during the first initialization process and in response to obtaining the first geo-locking authentication factor and the second geo-locking authentication factor, the first initialization process to complete.

15. The method of claim 14, wherein the second geo-locking authentication factor information includes a management system expected location, and wherein the initialization management subsystem determines that the second geo-locking authentication factor information corresponds to the authorized authentication information by determining that the management system expected location corresponds to the current location and the authorized initialization location.

16. The method of claim 14, further comprising:
deactivating, by the initialization management subsystem in response to allowing the first initialization process to complete, the geo-locking.

17. The method of claim 14, wherein the second geo-locking authentication factor information includes a signed second geo-locking authentication factor message, and wherein the initialization management subsystem is configured to:
verify, using a management system public key that provides the authorized authentication information and that is associated with the management system that is known to be provided at a closed location, the signed second geo-locking authentication factor message to obtain the second geo-locking authentication factor.

18. The method of claim 17, wherein the closed location includes a Local Area Network (LAN) that is not accessible via another network.

19. The method of claim 14, further comprising:
verifying, by the initialization management subsystem during the first initialization process and in response to identifying the first current location determined by the location determination subsystem, the authorized initialization location using at least one cryptographically signed certificate.

20. The method of claim 14, further comprising:
determining, by the initialization management subsystem during a second initialization process that is subsequent to the first initialization process, that geo-locking is activated;
causing, by the initialization management subsystem during the second initialization process and in response to determining that geo-locking is activated, power to be provided to the location determination subsystem;
identifying, by the initialization management subsystem during the second initialization process and subsequent to the power being provided to the location determination subsystem, a second current location determined by the location determination subsystem;
determining, by the initialization management subsystem during the second initialization process, that the second current location determined by the location determination subsystem does not corresponds to the authorized initialization location stored in the initialization management subsystem; and
halting, by the initialization management subsystem during the second initialization process and in response to determining that the second current location does not corresponds to the authorized initialization location, the second initialization process.

* * * * *